United States Patent [19]

Oshio et al.

[11] Patent Number: 5,027,217

[45] Date of Patent: Jun. 25, 1991

[54] SOLID-STATE IMAGING SYSTEM WITH A FEED-BACK CIRCUIT INCLUDING A VARIABLE PHOTO-SENSITIVITY CONTROL CIRCUIT

[75] Inventors: Toshiyuki Oshio, Yokoshiba; Kenji Tawata, Mobara; Masayoshi Mabashi, Tougane, all of Japan

[73] Assignee: Hitachi, Ltd., Tokyo, Japan

[21] Appl. No.: 318,004

[22] Filed: Mar. 2, 1989

[30] Foreign Application Priority Data

Mar. 11, 1988 [JP] Japan .................................. 63-56084

[51] Int. Cl.[5] .............................................. H04N 3/14
[52] U.S. Cl. .................. 358/213.19; 358/228
[58] Field of Search ...................... 358/213.19, 213.13, 358/228, 909

[56] References Cited

U.S. PATENT DOCUMENTS

| | | | |
|---|---|---|---|
| 4,335,405 | 6/1982 | Sakane et al. | 358/213.19 |
| 4,573,076 | 2/1986 | Tisue et al. | 358/213.19 |
| 4,574,309 | 3/1986 | Arisawa et al. | 358/213.19 |
| 4,870,493 | 9/1989 | Izawa et al. | 358/213.19 |

Primary Examiner—Joseph A. Orsino
Assistant Examiner—Jill Jackson
Attorney, Agent, or Firm—Antonelli, Terry, Stout & Kraus

[57] ABSTRACT

A solid-state imaging system is provided with: a solid-state imaging device including a first scanning circuit for outputting, in a time series manner, signals of a plurality of picture element cells arranged in a two dimensional manner, and a second scanning circuit which performs its vertical scanning operation individually from the vertical scanning operation performed by the first scanning circuit. A sensitivity setting circuit compares a read out signal from the solid-state imaging device and a reference signal which corresponds to the level of a signal to be set. The sensitivity setting circuit also controls the operation start timing of the second scanning circuit so as to make the two signals substantially the same, whereby a unit sensitivity variation is enlarged corresponding to an improvement in the sensitivity to be set for the solid-state imaging device.

5 Claims, 2 Drawing Sheets

SOLID-STATE IMAGING SYSTEM WITH A FEED-BACK CIRCUIT INCLUDING A VARIABLE PHOTO-SENSITIVITY CONTROL CIRCUIT

BACKGROUND OF THE INVENTION

1. Field of the invention

The present invention relates to a solid-state imaging system, and, more particularly, to a technique which can be effectively used for, for example, a device for taking out picture element signals formed by a photoelectric transferring element via a MOSFET and to which a sensitivity varying function is added.

2. Description of the Related Art

There is a known MOS solid-state imaging system to which a sensitivity varying function is added. This known solid-state imaging system includes a vertical scanning circuit for varying the sensitivity for the purpose of controlling a time difference from the reading vertical scanning circuit by making this vertical scanning circuit perform the vertical scanning operation. As a result, the storage time for the photodiode is controlled. Such a MOS solid-state imaging system having a sensitivity varying function of the type described above can be exemplified by, for example, a MOS solid-state imaging system disclosed in Japanese Patent Application No. 61-179902, corresponding to U.S. Pat. No. 4,870,493.

The imaging system using the solid-state imaging device performs the sensitivity control by making 1 H (horizontal scanning time) a minimum unit. The sensitivity control circuit in the solid imaging device controls its sensitivity at the most preferable level from the minimum sensitivity immediately after the power source is turned on. As a result of the thus-performed sensitivity control, the image is changed as image fade-in phenomenon occurs, causing the image to become observed easily.

However, when imaging starts under a relatively poor illuminance, a response problem arises in that a relatively longer time, for example 8 to 9 seconds, needs to be taken since the change from the minimum sensitivity to the maximum sensitivity is caused to be changed by 1 H unit.

It is an object of the present invention to provide a solid-state imaging system in which the response can be improved.

The above and other objects and novel features of the invention will more fully appear from the following description and the accompanying drawings.

SUMMARY OF THE INVENTION

A summary of the typical one according to the present invention will be be described.

In a sensitivity setting circuit which compares a read out signal from a solid-state imaging device including a sensitivity varying function and a reference signal corresponding to the signal level to be set, and forms a control signal to make both signals substantially the same, a function is provided which enlarges the unit sensitivity variation in accordance with an improvement in the sensitivity to be set in the solid-state imaging device.

According to the above-described means, the sensitivity change rate for one step can be further unified as a whole, and its responsibility can be improved since the sensitivity change can be enlarged in proportion to the increase in the sensitivity.

The present invention will be described hereinunder in detail with reference to the accompanying drawings.

Figure 3:
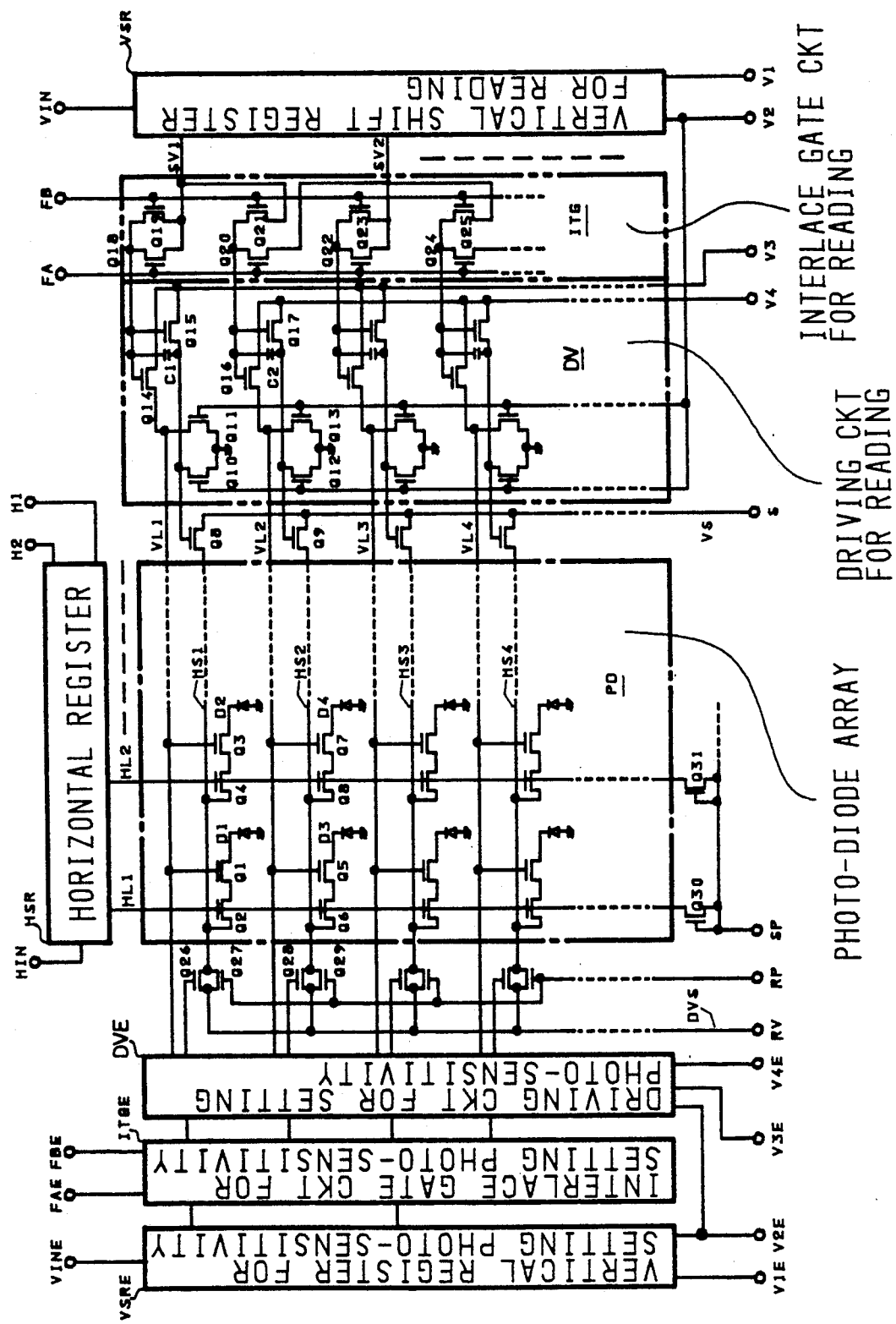
FIG. 3 is a view which illustrates an essential device according to an embodiment of the present invention.

FIG. 3 is a circuit diagram showing one example of a TSL (Transversal Signal Line) system MOS type solid-state image sensor circuit which may be employed in the solid-state image sensor according to the present invention and which enables the level of sensitivity thereof to be variable. The circuit elements shown in FIG. 3 are fabricated on a single semiconductor substrate such as single crystal silicon by a known semiconductor integrated circuit manufacturing technique, although not necessarily limited thereto. Principal circuit blocks shown in the figure are drawn in conformity with the actual geometrical layout on a semiconductor chip.

DETAILED DESCRIPTION

A picture element array PD will first be explained. In FIG. 3, a part of the array PD which consists of four rows and two columns is representatively illustrated. In order to prevent complication of the illustration, circuit symbols are put only to picture element cells for two rows among the four rows. One picture element cell is defined by a series circuit which consists of a photodiode D1, a switching MOSFET Q1 having its gate coupled to a vertical scanning line VL1, and a switching MOSFET Q2 having its gate coupled to a horizontal scanning line HL1. The respective output nodes of the other similar picture element cells (D2, Q3, Q4 . . . ) which are disposed along the same row (in the horizontal direction) as the picture element cell composed of the photodiode D1 and the switching MOSFETs Q1 and Q2 are coupled to a horizontal signal line HS1 which extends horizontally as viewed in the figure. Similarly, picture element cells which are the same as the above are coupled in regard to the other rows.

The horizontal scanning line HL1 which is exemplarily illustrated extends vertically as viewed in the figure and is coupled in common to the gates of switching MOSFETs Q2, Q6 . . . of picture element cells which are disposed along the same column. Picture element cells which are disposed along the other columns are also coupled to the corresponding horizontal scanning lines HL2 . . . in the same way as the above.

In this embodiment, switching MOSFETs Q8, Q9 and Q26, Q28 are provided at both ends, respectively, of the horizontal signal lines HS1 to HS4 . . . which constitute the picture element array PD, in order to add a virtual automatic diaphragm function to the solid-state image sensor circuit, that is, in order to make variable the substantial and electric storage time with respect to the photodiodes. The switching MOSFETs Q8 and Q9 which are disposed at the right-hand end operate so as to couple the respective horizontal signal lines HS1 and HS2 to an output line VS which extends vetically. The output line VS is coupled to a terminal S through which a read-out signal is transmitted to the input terminal of a preamplifier which is externally provided. The switching MOSFETs Q26 and Q28 which are disposed at the left-hand end operate so as to couple the respective horizontal signal lines HS1 and HS2 to a dummy (reset) output line DVS which extends vertically. Although not necessarily limited, the output line DVS is coupled to a terminal RV so that it is possible to deliver to the outside a signal output to the dummy output line DVS as desired.

In this embodiment, the horizontal signal lines HS1 to HS4 for the exemplarily illustrated four rows are respectively provided with switching MOSFETs Q27, Q29 which are turned ON in response to a reset signal that is supplied from a terminal Rp during the horizontal blanking period, although not necessarily limited hereto. When the MOSFETs Q27, Q29 ... are turned ON, a predetermined bias voltage is applied to each of the horizontal signal lines HS1 to HS4 from the terminal RV through the dummy output line DVS. The reason why the MOSFETs Q27, Q29 ... for resetting are provided is as follows. Semiconductor regions such as the drains of the switching MOSFETs which are coupled to the horizontal signal lines HS1 to HS4 may also have sensitivity to light, and therefore false signals (which may cause smear or blooming) formed by such parasitic photodiodes may be accumulated on the horizontal signal lines which are floating when they are in a non-select state. Therefore, in this embodiment all the horizontal signal lines HS1 to HS4 are reset to a predetermined bias voltage VB by making use of the horizontal blanking period as described above. Thus, in regard to each of the selected horizontal signal lines, a picture signal is always taken out in a state wherein the above-described false signals are reset, and it is therefore possible to reduce false signals contained in the output picture signal by a large margin.

The horizontal scanning lines HL1, HL2 ... are supplied with a horizontal scanning signal which is formed in a horizontal shift register HSR.

The scanning circuit which effects a vertical select operation (i.e., horizontal scanning operation) in the above-described picture element array PD is composed of the following circuits.

In this embodiment, a pair of scanning circuits are provided in conformity with the provision of the pairs of switching MOSFETs Q8, Q9 ... and Q26, Q28 ... at both ends of the horizontal signal lines HS1 to HS4 ... in the picture element array PD.

In order to enable application to industrial uses, this embodiment is arranged so that it is possible to effect scanning processes in addition to the interlaced scanning, i.e., a scanning process in which two rows can be selected simultaneously, and a non-interlaced scanning process. The following scanning circuit is provided at the right-handside of the picture element array PD. Namely, a vertical shift register VSR forms output signals SV1, SV2 ... which are employed for reading. These output signals SV1, SV2 are supplied to the vertical scanning lines VL1 to VL4 and also to the gates of the switching MOSFETs Q8, Q9 through an interlace gate circuit ITG and a driver circuit VD.

The interlace gate circuit ITG operates in the following manner in order to effect a vertical select operation (i.e., horizontal scanning operation) in the interlace mode. Namely, in the case of a first (odd-number) field, the vertical scanning lines VL1 to VL4 are selected in such a manner that a combination of adjacent vertical scanning lines, i e., one scanning line VL1 and a pair of adjacent vertical scanning lines VL2 and VL3, are simultaneously selected. More specifically, the output to signal SV1 from the vertical shift register VSR is output to the vertical scanning line VL1 for selecting the horizontal signal line HS1 by the operation of a switching MOSFET Q18 which is controlled by an odd-number field signal FA Similarly, the output signal SV2 from the vertical shift register VSR is output to both the vertical scanning lines VL2 and VL3 so as to simultaneously select the horizontal signal lines HS2 and HS3 by the operation of switching MOSFETs Q20 and Q22 controlled by the signal FA. Thereafter, select signals for selecting a pair of horizontal signal lines which are combined according to the same sequence as the above are formed.

In the case of a second (even-number) field, the vertical scanning lines VL1 to VL4 are selected in such a manner that a combination of adjacent vertical scanning lines, i.e., two paris of vertical scanning lines VL1, VL2 and VL3, VL4 are simultaneously selected. More specifically, the output signal SV1 from the vertical shift register VSR is output to the vertical scanning lines VL1 and VL2 for selecting the horizontal signal lines HS1 and HS2 by the operation of switching MOSFETs Q19 and Q21 which are controlled by an even-number field signal FB. Similarly, the output signal SV2 from the vertical shift register VSR is output to the vertical scanning lines VL3 and VL4 so as to simultaneously select the horizontal signal lines HS3 and HS4 by the operation of switching MOSFETs Q23 and Q25 which are controlled by the signal FB. Thereafter, select signals for selecting a pair of horizontal signal lines which are combined according to the same sequence as the above are formed.

A plurality of different kinds of horizontal scanning operation which will be explained hereinafter are realized by a combination of the above-described interlace gate circuit ITG and the driver circuit DV described below.

The output signal from the interlace gate circuit ITG which corresponds to the above-described one vertical scanning line VL1 is supplied to the gates of switching MOSFETs Q14 and Q15. The mutual drain electrode of these switching MOSFETs Q14 and Q15 is coupled to a terminal V3. The switching MOSFET Q14 supplies a signal supplied thereto from the terminal V3 to the vertical scanning line VL1. The switching MOSFET Q15 supplies a signal supplied thereto from the terminal V3 to the gate of the switching MOSFET Q8 which couples the horizontal signal line HS1 to the output line VS. In order to prevent the high level of the output signal from lowering by an amount corresponding to the threshold voltage of the switching MOSFETs Q14 and Q15, a capacitor C1 is provided between the gate of the MOSFET Q14 and the output side (source side) of the MOSFET Q15, although not necessarily limitative thereto. Thus, when the output signal from the interlace gate circuit ITG is raised to the high level, the potential at the terminal V3 is maintained at the low level and in the meantime the capacitor C1 is precharged. When the potential at the terminal V3 is raised to the high level thereafter, the gate voltage of the MOSFETs Q14 and Q15 can be raised by the bootstrap action by the capacitor C1.

The output signal from the interlace gate circuit ITG which corresponds to the vertical scanning line VL2 which is adjacent to the above-described vertical scanning line VL1 is supplied to the gates of switching MOSFETs Q16 and Q17. The mutual drain electrode of these switching MOSFET Q16 and Q17 is coupled to a terminal V4. The switching MOSFET Q16 supplies a signal supplied thereto from the terminal V4 to the vertical scanning line VL2. The switching MOSFET Q17 supplies a signal supplied thereto from the terminal v4 to the gate of the switching MOSFET Q9 which couples the horizontal signal line HS2 to the output line VS. In order to prevent the high level of the output signal from lowering by an amount corresponding to the threshold voltage of the switching MOSFETs Q16 and Q17, a capacitor C2 is provided between the gate of the MOSFET Q16 and the output side (source side) of the MOSFET Q17, although not necessarily limitative thereto. Thus, the gate voltage of the MOSFETs Q16 and Q17 can be raised by the bootstrap action by the capacitor C2 by changing the potential at the terminal V4 at the same timing as that described above.

The terminal V3 is provided in common to switching MOSFETs for driving which are provided in correspondence with odd-number vertical scanning lines (horizontal signal lines), while the terminal V4 is provided in common to even-number vertical scanning lines (horizontal signal lines).

As will be understood from the foregoing, it is possible to effect a read operation in the interlace mode by combining together the operation of selectively supplying timing signals to the terminals V3 and V4 and the operation of selecting two rows simultaneously which is effected by the interlace gate circuit ITG. For example, if, in the case of an odd-number field FA in which the potential of the terminal FB becomes high level, the terminal V3 is supplied with a timing signal synchronized with the operation of the vertical shift register VSR with the terminal V4 placed at the low level, the vertical scanning lines (horizontal lines) can be selected in the following sequence: VL1 (HS1), VL3 (HS3) . . . . In the case of an even-number field FB, in which the potential of the terminal FB becomes high level, the terminal V4 is supplied with a timing signal synchronized with the operation of the vertical shift register VSR with the terminal V3 placed at the low level, and it is thereby possible to select the vetical scanning lines (horizontal signal lines) in the following sequence: VL2 (HS2), VL4 (HS4) . . .

On the other hand, if the terminals V3 and V4 are simultaneously raised to the high level in the same manner as the above, a scanning process in which a pair of rows are simultaneously selected can be effected in accordance with the output signals from the interlace gate circuit ITG. In this case, since the combination of pairs of rows which are selected for each of the two fields in accordance with the field signals FA and FB is shifted vertically by an amount corresponding to one row as described above, it is possible to realize a vertical shift of spatial centroid, that is, an equivalent interlace mode.

If, for example, the signal FB alone is raised to the high level, and the horizontal shift register HSR is operated twice in response to one vertical scanning timing to raise the terminals V3 and V4 to the high level synchronously therewith, it is possible to realize a select operation in the non-interlace mode in which the vertical scanning lines are selected in the following sequence: VL1, VL2, VL3, VL4 . . . . In this case, it is preferable to double the frequency of the clock signals which are supplied to the horizontal shift register HSR and the vertical shift register VSR with a view to improving the picture quality. More specifically, if the frequency of the clock signals which are supplied to the horizontal and vertical shift registers HSR and VSR from terminals H1, H2 and V1, V2 is doubled, it is possible to read 60 pictures per minute in the non-interlace mode. It should be noted that terminals HIN and VIN supply input signals which are to be shifted by the shift registers HSR and VSR, respectively, and the shift operation of each shift register is started from the time when the input signal is supplied thereto. Accordingly, in the case where the above-described double-row simultaneous read scanning, interlaced scanning, non-interlaced scanning and the like are effected in accordance with the combination of input signals supplied to the interlace gate circuit ITG and the input terminals V3, V4, timing must be taken into consideration when the input signal is supplied to the shift register VSR so that the positional relationship between output signals in the vertical direction will not be reversed.

Resetting MOSFETs Q10 and Q11 are provided between the vertical scanning line VL1, the gate of the switching MOSFET respectively, in order to allow the vertical shift register VSR for reading and the vetical shift register VSRE for sensitivity control to operate synchronously with each other, although not necessarily limitative thereto. Accordingly, the terminals V1E and V1 and the terminals V2E and V2 may be made common to each other, respectively, by an internal circuit. The reason why the independent terminals V1E and V2E are provided as described above is to enable this solid-state image sensor to be applied to television cameras having manually-operated diaphragms or a conventional mechanical diaphragm function. Thus, consideration is taken so that, when no sensitivity control operation is effected, the terminals V1E and V2E are placed at a low level such as the ground potential of the circuit to thereby prevent electric power from being wastefully consumed in the vertical shift register VSRE.

The following is a description of the sensitivity control operation of the solid-state image sensor circuit in accordance with this embodiment.

To facilitate the explanation, the vertical scanning operation in the above-described non-interlace mode will be taken as an example in the following description. For example, the vertical shift register VSRE, interlace gate circuit ITGE and driver circuit DVE for sensitivity control are made to effect a select operation for the fourth row Q8 corresponding thereto, and the ground potential point of the circuit. These resetting MOSFETs Q10 and Q11 are supplied with the clock signal from the terminal V2, the clock signal being supplied in common to all resetting MOSFETs provided in correspondence with the other vertical scanning lines and their corresponding switching MOSFETs, and the MOSFETs Q10 and Q11 operate to quickly draw the potential of the vertical scanning line in a selected state and the gate potential of the corresponding switching MOSFET to the low level.

In this embodiment, a vertical shift register VSRE, an interlace gate circuit ITGE and a driver circuit DVE for sensitivity control are additionally provided in order to add a sensitivity variable function. These circuits for sensitivity control are disposed on the left-hand side of the picture element array PD, although not necessarily limited thereto. The vertical shift register VSRE, interlace gate circuit ITG and driver circuit DVE have circuit configurations similar to those of the above-described vertical shift register VSR, interlace gate circuit ITG and driver circuit DV for reading. Timing signals which are similar to the above are supplied from terminals V1E to V4E, VINE, FAE and ABE, respectively. In this case, the terminals V1E and V1 and the terminals V2E and V2 are supplied with the same clock signals, (the vertical scanning line VL4; the horizontal signal line HS4) in parallel to the read operation for the first row (the vertical scanning line VL1; the horizontal signal line HS1) effected by the vertical shift register VSR, interlace gate circuit ITG and driver circuit DV for reading. Thus, photo signals accumulated in the photodiodes D1, D2 ... in the first row are read out to the output signal line VS in a time-series manner in synchronism with the select operation for the horizontal scanning lines HL1, HL2 ... in response to the horizontal scanning signal formed in the horizontal shift register HSR. This read operation is carried out by the supply of a current corresponding to each of the photo signals from the terminal S through a load resistor, and the precharge (reset) operation is carried out simultaneously with the read operation. A similar operation is also effected for the photodiodes disposed along the fourth row. In this case, the read operation for the fourth row is effected with respect to the dummy output line DVS by the above-described scanning circuit (VSRE, ITGE and DVE) for sensitivity control. In the case where the sensitivity control operation alone is conducted, the terminal RV is supplied with the same bias voltage as that applied to the terminal S. Thus, the photo signal which has already been accumulated in each of the picture element cells disposed along the fourth row is swept out, that is, a reset operation is effected.

Accordingly, the read operation for the fourth row (the vertical scanning line VL4; the horizontal signal line HS4) by the vertical shift register VSR, interlace gate circuit ITG and driver circuit DV is carried out after the read operation for the first to third lines by the above-described vertical scanning operation. Therefore, the storage time of the photodiode in each of the picture element cells disposed along the fourth row is equal to the time which is required to read all the picture element cells for the three rows.

In place of the above-described operation, the vertical shift register VSRE, interlace gate circuit ITGE and driver circuit DVE for sensitivity control are made to effect a select operation for the second row (the vertical scanning line VL2; the horizontal signal line HS2) in parallel to the read operation for the first row (the vertical scanning line VL1; the horizontal signal line HS1) effected by the vertical shift register VSR, interlace gate circuit ITG and driver circuit DV for reading. Thus, photo signals accumulated in the photodiodes D1, D2 ... in the first row are read out to the output signal line VS in a time-series manner in synchronism with the select operation for the horizontal scanning lines HL1, HL2 ... in response to the horizontal scanning signal formed in the horizontal shift register HSR. This read operation is carried out by the supply of a current corresponding to each of the photo signals from the terminal S through a load resistor, and the precharge (reset) operation is carried out simultaneously with the read operation. A similar operation is also effected for the photodiodes D3, D4 ... which are disposed along the seocnd row. Thus, the photo signal which has already been accumulated in each of the picture element cells disposed along the second row is swept out, that is, a reset operation is effected. Accordingly, the read operation for the second row (the vertical scanning line VL2; the horizontal signal line HS2) by the vertical shift register VSR, interlace gate circuit ITG and driver circuit DV is carried out after the read operation for the first row by the above-described vertical scanning operation. Therefore, the storage time of the photodiode in each of the picture element cells disposed along the second row is equal to the time which is required to read all the picture element cells for one row. Thus, the virtual storage time of the photodiodes can be reduced to one third of that in the case of the above, that is, it is possible to lower the sensitivity to one third of that in the above-described case.

Figure 2:
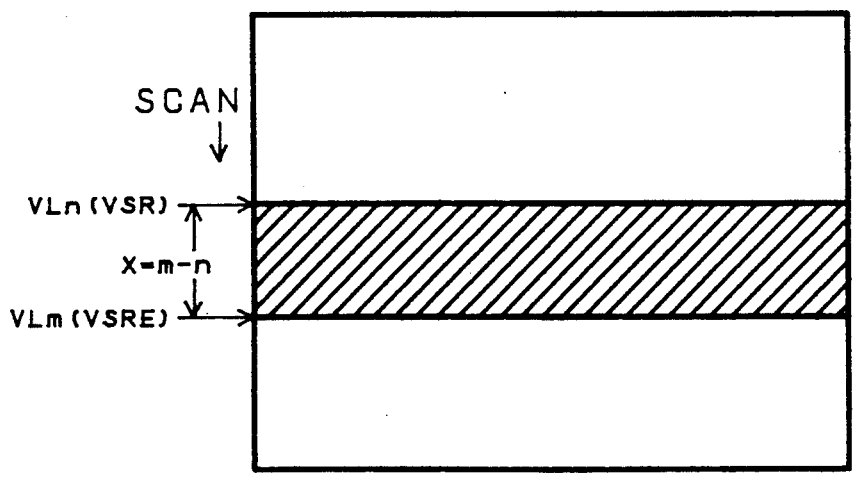
FIG. 2 is a view which illustrates a frame for use in explanation of the sensitivity setting operation.

This fact will be further described generally. As shown in FIG. 2, when the sensitivity controlling scanning circuit performs its operation for selecting the m-th vertical scanning line V1m and the reading scanning circuit performs its operation for selecting the n-th vertical scanning line VLn, there is time difference X (m−n) H, wherein symbol H represents a horizontal scanning time. Therefore, because of a fact that when the vertical scanning line VLm is scanned by the preceding vertical scanning operation, the picture element cells on this vertical scanning line VLm are reset. Therefore, time (XH) taken from this resetting operation to time at which the vertical scanning line VLm is again selected by the above-described reading scanning circuit is determined to be a storage time for the photodiode. Therefore, in a picture element array consisting 525 rows, it is possible to set a storage time over a considerably multistages, i e., in 525 steps with read time for one 1 H arranged as a unit (minimum), that is, it is possible to set sensitivity at any of 525 levels. However, it is assumed that the vertical scanning operation is a non-interlace mode, the variations in the illuminance at the light-receiving surface may be ignored with respect to the scanning time for the above-described one frame and substantially constant light is incident on the photodiodes. In the interlace mode, the sensitivity (storage time) is arranged to be a range from 1 H to 262 H since one field thereof becomes 262.5 H which is obtained by 525/2. It is noted that the highest sensitivity (525 H or 262 H) is obtained when the scanning circuit VSRE and so on are in an inoperative state.

In a sensitivity control operation of the type described above, the reading of picture element signal and the resetting operation by the vertical scanning operation are simultaneously performed. As a result, there is a possibility that the picture element signals for this resetting operation can be mixed with the reading signals due to a capacitive coupling via a substrate or the like. If such capacitive coupling occurs, noise such as ghost generated in a TV tuner can be generated, causing the quality of the image to deteriorated.

To this end, according to the present invention, a function is, provided which forcedly brings all of the horizontal scanning lines such as HL1 and HL2 into a selected state from the outside terminal SP via the MOSFETs Q30 and Q31 connected to the diode; although the invention is not necessarily limited to this. That is, when the above-described terminal Sp is brought into a high level, all of the diode type MOSFETs Q30 and Q31 are brought into a turned-on state regardless of the operation of the horizontal shift register HSR, causing this high level to be supplied to all of the horizontal scanning lines HL1 and HL2. As a result, the horizontal scanning lines HL1 and HL2 can be brought to a selected state. Furthermore, since the structure is arranged in such a manner that the above-described selected level is supplied via the above-described diode type one-way device such as the MOSFETs Q30 and Q31, the MOSFETs Q30 and Q31 can be maintained at their turned-off state by bringing the terminal Sp into a low level. As a result, even if a forced simultaneous selecting circuit of the type described above is provided, the operation in which the horizontal scanning lines HL1 and HL2 which have followed the shifting operation of the horizontal shift register HSR are brought into a selected level in a time series manner cannot be prevented. If an insufficient affection in the shifting operation performed by the horizontal shift register HSR occurs depending upon the forcedly selected level of the horizontal scanning lines HL1 and HL2 due to its dynamic type circuit structure, a switch circuit or the like which prevents the transmission of the selected level into the horizontal shift register HSR.

The above-described simultaneous selection operation of the horizontal scanning lines HL1 and HL2 are performed during a horizontal retrace period, and the above-described preceding vertical scan is started. As a result, all of the picture elements of a row to be reset are previously and forcedly reset. Therefore, the picture element signals are not substantially output from the preceding lines when the picture element signals are read in accordance with the selection operation of the horizontal scanning lines performed by the horizontal shift register HSR. It leads to a fact that the noise of the type described above can be prevented in the read signals even if the capacitive coupling via the substrate or the like is present.

Figure 1:
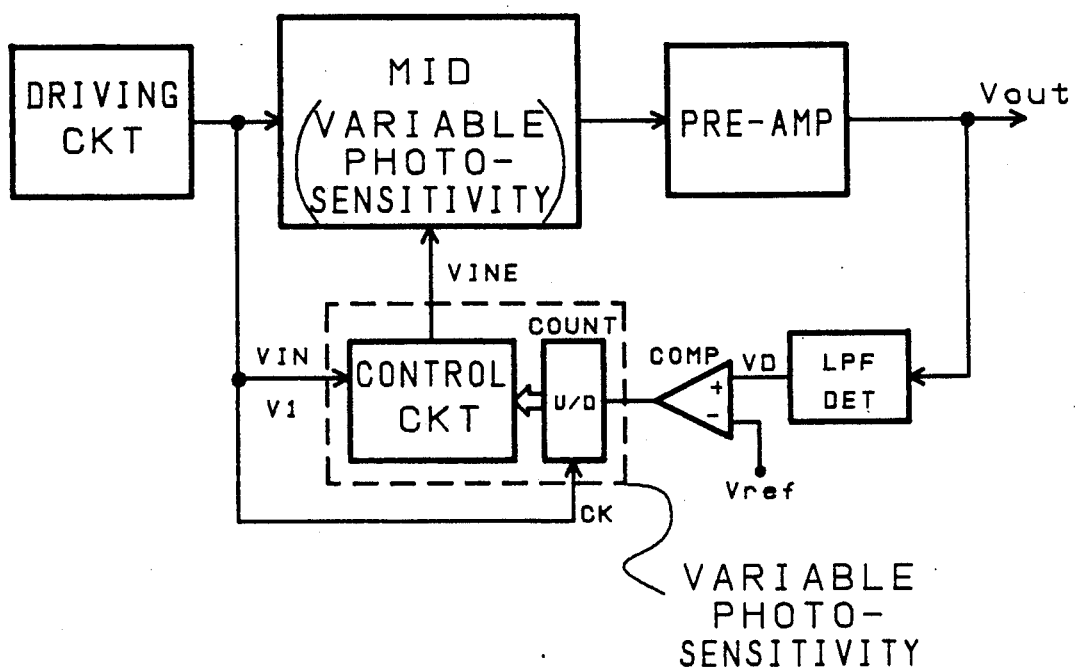
FIG. 1 is a block diagram of an embodiment of the solid-state image system with an automatic aperture function.

FIG. 1 is a block diagram of one embodiment of the solid-state imaging system having an automatic aperture function in which the solid imaging device is used.

A solid-state imaging device MID has, as shown in FIG. 1, the sensitivity varying function. The read-out signal output from the solid-state imaging device MID is amplified by a preamplifier. The thus-amplified signal Vout is supplied to a signal precessing circuit (omitted from illustration), where, for example, it is formed into a TV visual signal. This amplified signal Vout is also utilized for controlling the automatic aperture. That is, the amplified signal Vout is converted into an averaged D.C. level by a smoothing circuit comprising a low-pass filter LPD and a wave detection circuit DET. The thus-obtained D.C. level VD is supplied to an input (+) of a voltage comparing circuit COMP. To another input (−) of this voltage comparing circuit COMP, a reference voltage Vref which corresponds to the level of the signal read from the solid-state imaging device MID is supplied. The output signal formed by the voltage comparing circuit COMP is supplied to an UP/-DOWN control terminal U/D of an UP/DOWN counter circuit COUNT which forms the sensitivity control circuit. The count output signal from the counter circuit COUNT is supplied to the control circuit CONT. This control circuit CONT decodes the count output signal and as well refers the read timing of the solid-state imaging device MID upon receipt of signals VIN and V1 from a driving circuit which supplies a clock signal for controlling the scanning time so that a signal VINE which substantially precedes this timing is formed. That is, the preceding timing signal VINE which corresponds to the necessary aperture (sensitivity) is formed. In actuality, the signal VINE is formed after the timing signal VIN. However, since scanning is repeatedly carried out, the signal VIN seems to be formed after the signal VINE in the ensuing scanning of the frame. More specifically, if the timing signal VINE is generated 1 H after the timing signal VIN, the timing signal VINE is regarded as a timing signal preceding the timing signal VIN by 261 H (in an interlace mode) in the next scanning frame. Since the shift operation by each of the vertical shift registers VSR and VSRE starts by these timing signals VIN and VINE, the above-described sensitivity varying operation is thus performed.

According to this embodiment, the above-described counter circuit COUNT performs the arithmetic operation for one step of UP or DOWN in accordance with the output from the voltage comparing output COMP by a vertical synchronization timing signal CK between the odd-number fields and the even-number fields. Therefore, the substantial sensitivity determining operation performed by the control circuit CONT is performed once in a frame. The reason for the fact that the sensitivity determining operation is performed once in a frame lies as follow:

The sensitivity determining operation can be performed in every odd/even number-fields. However, an excessive sensitivity determination is performed in the vicinity of the proper control level due to this operation, causing flickers to be generated.

In order to improve the response, a sensitivity variation arranging 1 H as a unit control is performed in a region in which the sensitivity (which corresponds to symbol X in FIG. 2) determined for the solid-state imaging device MID is low. That is, in the region in which setting from 1 H to 23 H is arranged, the sensitivity is varied by +1 H or −1 H in each UP or DOWN step. In the intermediate region in which the sensitivity X is ranged from 24 H to 72 H, although not specifically limited, the sensitivity variation is performed by arranging 4 H as a unit control. That is, in the region in which X is ranged from 24 H to 72 H, the sensitivity is varied by +4 H or −4 H in each UP or DOWN step. In the region in which sensitivity X is high from 73 H to 261 H, although not specifically limited, the sensitivity is varied by arranging 9 H as a unit control. That is, in the region in which X is set from 73 H to 261 H, the sensitivity is varied by +9 H or −9 H in each UP or DOWN step.

The above-described sensitivity setting may be performed by a structure arranged in such a manner that: when a binary arithmetic operation in which the UP/-DOWN counting is performed in accordance with the output from the voltage comparing circuit COMP is performed by the counter circuit COUNT, it outputs upon the count is input into a conversion table formed by a ROM or the like as to be replaced by the above-described type horizontal timing. Alternatively, a structure may be employed in which the counter circuit COUNT is formed by registers and arithmetic circuit as to performed the arithmetic operation by +1 H, 4 H, and +9 H is performed in accordance with the output from the voltage comparing circuit COMP.

In this embodiment, for example, if an UP signal is formed when the sensitivity X is at an intermediate level 10 H in the low sensitivity region, it becomes 11 H when the UP signal is formed. The ratio of the variation of the sensitivity becomes 1.1 times. If an UP signal is similarly formed when the sensitivity X is at an intermediate level 40 H in the intermediate sensitivity region, it becomes 44 H after it has been changed by 4 H. The ratio of the variation of the sensitivity becomes 1.1 times. If an UP signal is similarly formed when the sensitivity X is at an intermediate level 181 H in the high sensitivity region, it becomes 190 H, after it has been changed by 9 H. The ratio of the variation of the sensitivity becomes 1.05 times. As a result, the entire ratio of the variation of the sensitivity can be made uniform. On the other hand, when the sensitivity is high as described above, the unit sensitivity control may be made large, for example, 18 H. However, in this state, the sensitivity adjustment width is made fine for the purpose of performing a further precise sensitivity control.

The region in which the sensitivity X is at a low level is arranged to be 23 steps from 1 H to 23 H, the intermediate sensitivity region is arranged to be 13 steps $((72-24)/4 +1)$, and the high sensitivity region is arranged to be 22 steps $((261-73)/9+1)$. Therefore, a setting from the minimum level 1 H to the maximum level 261 H can be completed by 58 times of the sensitivity raising operation. As a result, the time taken for performing the sensitivity control performed once for a frame as described above can be shortened to 2 seconds or less. As a result, the response can be significantly improved since the setting from the minimum sensitivity to the maximum sensitivity can be performed within 2 seconds after the power source has been turned on.

An effect obtained from the above-described embodiments will be described.

In a sensitivity setting circuit which compares a read out signal from a solid-state imaging device including a sensitivity varying function and a reference signal corresponding to the signal level to be set, and forms a control signal to make the both signals substantially the same, a function is provided which enlarges the unit sensitivity variation in accordance with an improvement in the sensitivity to be set in the solid-state imaging device. According to this structure, the sensitivity variation rate for a step can be further made uniform as a whole, and the number of the overall steps can be considerably reduced. As a result, the setting speed from the minimum sensitivity to the maximum sensitivity and the setting from the maximum sensitivity to the minimum sensitivity can be raised. Consequently, the responsibility can be significantly improved.

Although the invention has been described in its embodiments with a certain degree of particularity, it is to be understood that the invention is not limited to the specific embodiments thereof, and various changes and modifications may be made in the invention without departing from the spirit and scope thereof. For example, the analog circuit for processing the read out signals arranged in such a manner that the average values is simply obtained as described above may be replaced by a structure arranged in such a manner that the aperture is set by obtaining the peak values as to mix them. Alternatively, a structure may be employed in which the smoothing output level is converted into a digital value as to calculate the difference between the thus-obtained digital value and a digital reference signal. The solid-state imaging apparatus according to the present invention for use as an imaging apparatus may be applied to the above-described MOS solid-state imaging apparatus, and the same may be as well applied to a imaging apparatus in which a CCD (Charge Coupled Device) is employed. That is, a structure may be employed which is arranged in such a manner that a reset circuit for sweeping out the charge of the photodiode in the preceding line with respect to the line to be read is added, and this reset circuit is brought into an operative state by a sensitivity setting scanning circuit as to obtain the sensitivity varying function.

The present invention can be widely used in solid-state imaging apparatus which uses the solid-state imaging device the sensitivity of which is arranged to be varied by sweeping out the signal in the preceding line with respect to the line to be read.

A major object obtained from the typical embodiment according to the present invention will now be described. That is, in a sensitivity setting circuit which compares a read out signal from a solid-state imaging device including a sensitivity varying function and a reference signal corresponding to the signal level to be set, and forms a control signal to make the both signals substantially the same, a function is provided which enlarges the unit sensitivity variation in accordance with an improvement in the sensitivity to be set in the solid-state imaging device. According to this structure, the sensitivity variation rate for a step can be further made uniform as a whole, and the number of the overall steps can be considerably reduced. As a result, the setting speed from the minimum sensitivity to the maximum sensitivity and the setting from the maximum sensitivity to the minimum sensitivity can be raised.

What is claimed is:

1. An automatic iris control circuit comprising:
   a solid-state imaging device including a plurality of photo-electric converting elements, a reset circuit for sweeping out at a time $t_0$ accumulated charges in each of said elements, and an output circuit for reading out at a time $t_1$ a signal accumulated in each of said elements and for providing an output signal based on said reading out from each of said elements, the sensitivity of each of said elements depending on a time interval T from the sweeping timing $t_0$ to the reading timing $t_1$;
   a detecting circuit for detecting the output level of said output signal of said output circuit; and
   a timing control circuit for setting said time interval T in response to an output of said detecting circuit to form a negative feedback loop for said automatic iris control circuit,
   wherein said timing control circuit varies said time interval T by a first amount of time $\Delta TL$ when the preceding time interval T is within a first range and by a second amount of time $\Delta TH$ which is greater than said first amount $\Delta TL$ when said preceding time interval is within a second range any value in which is greater than any value of said first range.

2. An automatic iris control circuit according to claim 1, wherein said timing control circuit varies said time interval T by changing said sweeping timing in reference to said reading timing.

3. An automatic iris control circuit according to claim 2, wherein said automatic iris control is used for a television camera and wherein:
   said timing control circuit repeatedly varies said time interval one time a frame period of said television camera.

4. An automatic iris control circuit according to claim 1, wherein said timing control circuit further includes means for varying said time interval T by a third amount of time $\Delta TM$, which is greater than said first amount $\Delta TL$ and is less than said second amount $\Delta TH$, when said preceding time interval is within a third range any value in which is greater than any value of said first range and is less than any value of said second range.

5. A video camera with an automatic iris control circuit comprising:
- a solid-state imaging device including a plurality of photo-diodes, a reset circuit for sweeping out at a time $t_0$ accumulated charges in each of said photo-diodes, and an output circuit for reading out at a time $t_1$ a signal accumulated in each of said photo-diodes and for providing and output signal based on said reading out from each of said photo-diodes, the sensitivity of each of said photo-diodes depending on a time interval T from the sweeping timing $t_0$ to the reading timing $t_1$;
- an amplifier for amplifying the output signal derived from said output circuit;
- a detecting circuit for detecting an output signal level of said amplifier to produce a detecting voltage;
- a comparator providing a first output when said detecting voltage is less than a reference voltage and a second output when said detecting voltage is greater than said reference voltage; and
- a timing control circuit for setting said time interval so as to increase said time interval when said comparator provides said first output and to decrease said time interval when said comparator provides said second output, wherein said timing control circuit varies said time interval T by a first amount of time $\Delta TL$ when the preceding time interval T is within a first range and by a second amount of time $\Delta TH$ which is greater than said first amount $\Delta TL$ when said preceding time interval is within a second range any value in which is greater than any value of said first range.

* * * * *